(12) United States Patent
Licht

(10) Patent No.: US 9,368,846 B2
(45) Date of Patent: Jun. 14, 2016

(54) VANADIUM BORIDE AIR MULTIPLE ELECTRON HIGH CAPACITY BATTERY

(75) Inventor: Stuart Licht, Leesburg, VA (US)

(73) Assignee: The George Washington University, Washington, DC (US)

( * ) Notice: Subject to any disclaimer, the term of this patent is extended or adjusted under 35 U.S.C. 154(b) by 612 days.

(21) Appl. No.: 13/814,904

(22) PCT Filed: Aug. 10, 2011

(86) PCT No.: PCT/US2011/047237
§ 371 (c)(1),
(2), (4) Date: Feb. 7, 2013

(87) PCT Pub. No.: WO2012/021607
PCT Pub. Date: Feb. 16, 2012

(65) Prior Publication Data
US 2013/0134948 A1 May 30, 2013

Related U.S. Application Data

(60) Provisional application No. 61/372,352, filed on Aug. 10, 2010.

(51) Int. Cl.
| | |
|---|---|
| *H02J 7/00* | (2006.01) |
| *H01M 12/08* | (2006.01) |
| *H01M 4/58* | (2010.01) |
| *H01M 12/06* | (2006.01) |
| *B02C 17/00* | (2006.01) |
| *B02C 23/18* | (2006.01) |
| *H01M 10/44* | (2006.01) |

(52) U.S. Cl.
CPC ............... *H01M 12/08* (2013.01); *B02C 17/00* (2013.01); *B02C 23/18* (2013.01); *H01M 4/5825* (2013.01); *H01M 10/44* (2013.01); *H01M 12/06* (2013.01)

(58) Field of Classification Search
CPC ...................................................... Y02E 60/12
USPC .......................................................... 320/137
See application file for complete search history.

(56) References Cited

U.S. PATENT DOCUMENTS

| | | | |
|---|---|---|---|
| 4,474,862 A | 10/1984 | Buzzelli et al. | |
| 2002/0177042 A1 | 11/2002 | Amendola | |
| 2004/0131934 A1 | 7/2004 | Sugnaux et al. | |
| 2008/0233032 A1 | 9/2008 | Shim et al. | |
| 2008/0261094 A1* | 10/2008 | Licht ...................... H01M 4/06 429/403 |

OTHER PUBLICATIONS

Kim, et al., Mechanochemical Synthesis and Characterization of $TiB_2$ and $VB_2$ nanopowders, Materials Letters, 2008, 62: 2461-2464.
Licht, et al., Nanoparticle Facilitated Charge Transfer and Voltage of a High Capacity $VB_2$ Anode, Electrochemical and Solid-State Letters, 2011, 14:6: A83-A85.

* cited by examiner

*Primary Examiner* — Suresh Memula
(74) *Attorney, Agent, or Firm* — Blank Rome LLP; Peter S. Weissman

(57) ABSTRACT

A battery and methods of forming vanadium boride nanoparticles of an anode within a battery, and a method for recharging an air battery. The battery comprises an anode and a cathode in electrochemical contact with each other through an electrically neutral ionic conductor (an electrolyte). The cathode may comprise a catalyst effective for the reduction of dissolved oxygen. An electrical discharge of the anode is performed via multiple electron oxidation of vanadium boride.

13 Claims, 9 Drawing Sheets

VANADIUM BORIDE AIR MULTIPLE ELECTRON HIGH CAPACITY BATTERY

CROSS REFERENCE TO RELATED APPLICATIONS

This application is a National Phase of Application No. PCT/US2011/047237 filed Aug. 10, 2011, which claims the benefit of U.S. Provisional Patent Application No. 61/372,352 filed on Aug. 10, 2010, which are incorporated herein in their entirety.

STATEMENT OF GOVERNMENT RIGHTS

This invention was made with government support under NSF Grant 1006568 awarded by National Science Foundation. The government has certain rights in the invention

BACKGROUND

Disclosed herein are electric storage cells (e.g., batteries), and more specifically, an improved vanadium boride-air multiple electron high capacity battery.

Transformative advances are needed to increase electrochemical energy storage density within power systems for devices ranging from hearing aids and military power packs to electric cars. Current electrochemical charge storage systems (e.g., Li-ion batteries) are limited in their charge storage density based on their utilization of materials that are restricted to predominantly single electron charge storage processes. One problem associated with vehicle electrification is the battery energy capacity that stores only a fraction of the energy of gasoline. This constrains both the driving range and increases the cost of electric cars.

Recent studies disclose that the storage of multiple electrons per molecular site provides opportunities to greatly enhance electrochemical energy capacity. For example, these include studies concerning multi-electron redox couples for charge storage, ranging from the two redox chemistry of solid sulfur, to the three electron oxidation of aluminum, to the reduction of hexavalent (super) irons and also studies of permanganates, metal chalcogenides, peroxides, polyiodides, iodate, and stannates.

One study for high energy density multi-electron charge storage is the multiple electron oxidation of a vanadium boride anode when coupled with air as a cathode, similar to the system used in zinc (anode)-air (cathode) batteries. The vanadium boride ($VB_2$) undergoes an extraordinary 11 electron per molecule oxidation and provides an intrinsic 11 Faraday, per 72.6 grams/mole (g/mol) molecular weight, which is 4060 milliamperes/gram (mAh/g). Further, with a density of 5.10 kilograms/liter (kg/L), it has a volumetric capacity of Q ($VB_2$)=approximately 20,700 amperes hour/liter (Ah/L). This is ten-fold, 3.5-fold, and 2.5-fold higher than the intrinsic capacity of lithium, zinc or aluminum. Discharge of all 11 electrons occurs at a single anodic potential. The 11 electron per molecule oxidation includes oxidation of the tetravalent transition metal ion, V ($+4 \rightarrow +5$), and each of the two boron's $2 \times B$ ($-2 \rightarrow 3$). Vanadium boride batteries cannot be recharged in a conventional manner and vanadium boride has been susceptible to corrosion, which can result in a loss of battery storage capabilities.

Therefore it is desirable to provide an improved vanadium boride-air multiple electron high capacity battery that may be recharged.

SUMMARY

Disclosed herein is a method of making an anode comprising ball milling vanadium boride microparticles using a grinding medium having a hardness greater than or equal to the hardness of the vanadium boride to form vanadium boride nanoparticles. The vanadium boride nanoparticles are combined with carbon, such as graphite, carbon black, graphene, or carbon nanoparticles or nanorods, to form the anode. The anode comprises greater than or equal to 1 weight percent vanadium boride nanoparticles based on the total weight of the anode. The vanadium boride microparticles may be ball milled with an aliphatic carboxylic acid having 3 to 33 carbons atoms or an aliphatic carboxylic acid salt having 3 to 33 carbon atoms to form the vanadium boride nanoparticles. Alternatively, the vanadium boride nanoparticles can be formed by a method comprising ball milling elemental vanadium and boron in a 1:2 molar ratio at 200 to 600 RPM for 10 minutes to 5 hours.

The anode can be used with an anode to form a battery. The battery comprises an anode and a cathode in electrochemical contact with each other through an electrically neutral ionic conductor (an electrolyte). The cathode may comprise a catalyst effective for the reduction of dissolved oxygen. An electrical discharge of the anode is performed via multiple electron oxidation of vanadium boride.

After electrical discharge the battery may be recharged by a method comprising removing electrolyte from the discharged anode to form a dried discharged anode and exposing the dried discharged anode to hydrogen gas at a temperature greater than or equal to 100° C. for a time sufficient to form vanadium boride from the discharged anode. The discharged anode can also be recharged electrochemically.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
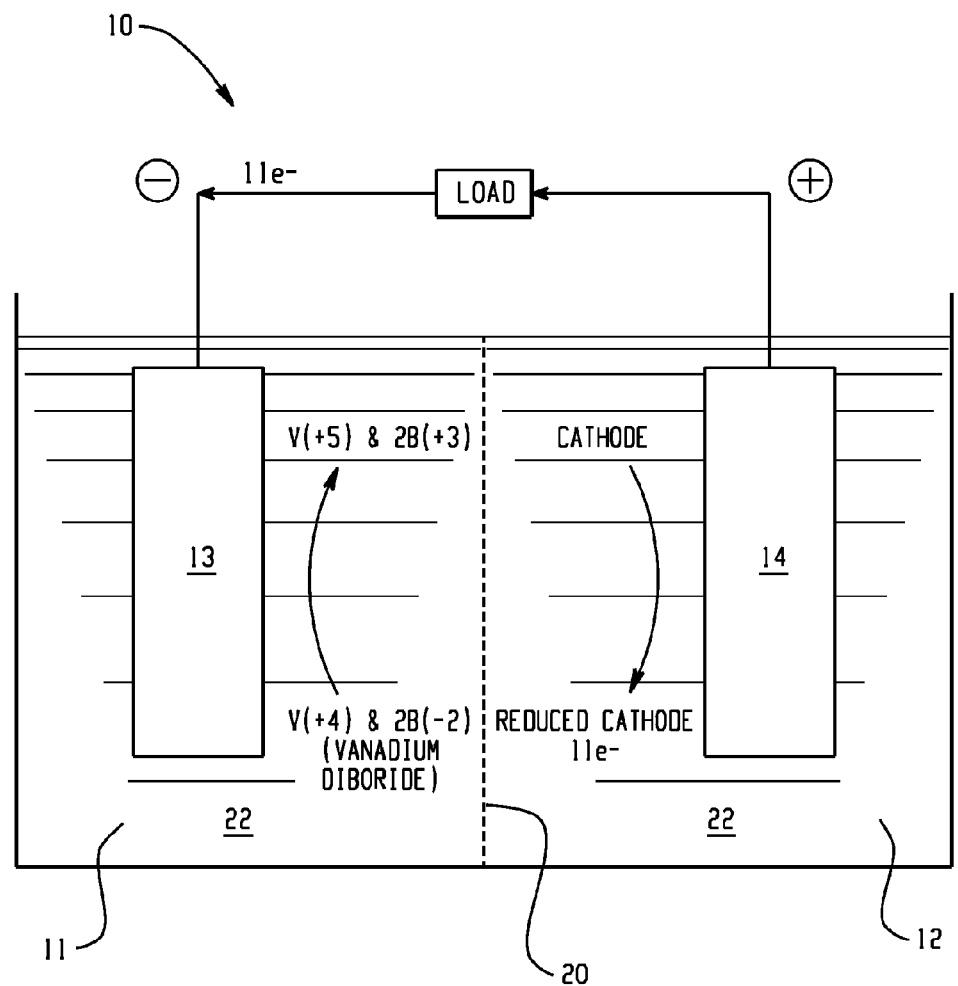
FIG. 1 is a diagram illustrating a battery.

A decrease of vanadium boride particle size from micrometer to nanometer provides an opportunity to facilitate charge transfer of battery materials, and an improvement in power, voltage and dept of discharge of batteries. However, while this promotes electrochemical charge transfer, it exposes the particle to a greater risk of decomposition through enhanced chemical reactivity. Additionally, some methods of vanadium boride nanoparticle synthesis yield materials which are unstable and do not function well in an anode.

Disclosed herein are nano-particulate vanadium borides formed by recognizing the unusual hardness of the vanadium boride salt (e.g., approximately 8-9 Mohs) and using a mechanical synthesis (ball milling) having a grinding medium media (e.g., tungsten carbide) with a hardness comparable or greater than that of the vanadium boride. As used herein "grinding medium media" refers to the milling vessel and milling balls. Vanadium boride nanoparticles (also referred to as nano-particulate vanadium borides) are particles having no single linear dimension (length, width, diameter, or height) greater than 100 nanometers. Mechanical synthesis (ball milling) is different from mechanico-chemical synthesis. Mechanical synthesis of the nanoparticles occurs in the absence of a chemical reaction to form the nanoparticle compound. Otherwise stated, vanadium boride microparticles are ball milled to form vanadium boride nanoparticles. This is contrasted with mechanico-chemical synthesis in which reactants are ball milled and simultaneously reacted to form a product which is chemically different from the reactants.

Ball milling of the vanadium boride microparticles can be performed for a time sufficient to form nanoparticles, typically 30 minutes to 3 hours. Within this range the ball milling time can be greater than or equal to one hour. Also within this range the ball milling time can be less than or equal to 2 hours. The milling vessel is typically filled with a non-reactive gas such as argon or nitrogen. The milling vessel and starting material are at room temperature at the start of ball milling. Ball milling is performed using 200 to 650 rotations per minute (rpm). Within this range the rotations per minute can be greater than or equal to 500. Also within this range the rotations per minute can be less than or equal to 600.

The vanadium boride microparticles may be ball milled with an aliphatic carboxylic acid or an aliphatic carboxylic acid salt. The choice of aliphatic carboxylic acid may include, but is not limited to, acids of the formula, $CH_3(CH_2)_xCOOH$, where examples of x in the formula range from x=1-5 (propanoic, butyric, valeric, caproic, enanthic acid), or x=6-10 (caprylic, pelargonic carpric undecylic, lauric acid) or x=11-32 (tridecylic, myrstic, pentadecylic, palmitic, margaric, stearic, nonadecylic, arachidic, heneicosylic, behenic, tricosylic, lignoceric, pentacosylic, cerotic, heptacosylic, montanic, nonacosylic, merlissic, henatriacontylic, lacceroic, psyllic, geddic, cerosplastic, and hexatriacontylic acid). The aliphatic carboxylic acid or aliphatic carboxylic acid salt can be used in an amount of 1 to 20 weight percent, based on the total amount of material being ball milled.

The vanadium boride nanoparticles can also be formed by mechanico chemical synthesis. Elemental vanadium and boron are combined an 1:2 molar ratio and are ball milled using ball milling media having sufficient hardness for milling vanadium boride as discussed above. Ball milling is conducted under an inert atmosphere (such as argon or nitrogen) at 200 to 600 RPM. Milling time can vary from 10 minutes to 5 hours.

The vanadium boride nanoparticles are combined with carbon to form the anode. Exemplary types of carbon include graphite, carbon black, graphene, or carbon nanoparticles and nanorods. The anode comprises greater than or equal to 1 weight percent vanadium boride nanoparticles, based on the total weight of the anode. The anode can comprise the vanadium nanoparticles in amounts greater than or equal to 10 weight percent, or, greater than or equal to 20 weight percent, or greater than or equal to 30 weight percent, or, greater than or equal to 40 weight percent. The anode can comprise the vanadium nanoparticles in amounts less than or equal to 100 weight percent, or, less than or equal to 80 weight percent, or less than or equal to 70 weight percent, or, less than or equal to 60 weight percent.

The anode is electrochemical contact with a cathode through an electrolyte to form a battery. A battery 10 is shown in FIG. 1 for example. The battery 10 comprises two half cells (11 and 12) which are in an electrochemical contact with each other through an electrolyte 22. The first half-cell 11 comprises an anode 13 and the second half-cell 12 comprises a cathode 14. An electrical discharge of the anode 13 is performed via multiple electron oxidation of vanadium boride. Electrolyte 22 may be an aqueous solution including a high concentration of hydroxide such as KOH or any other suitable ionic conductor material.

Figure 2:
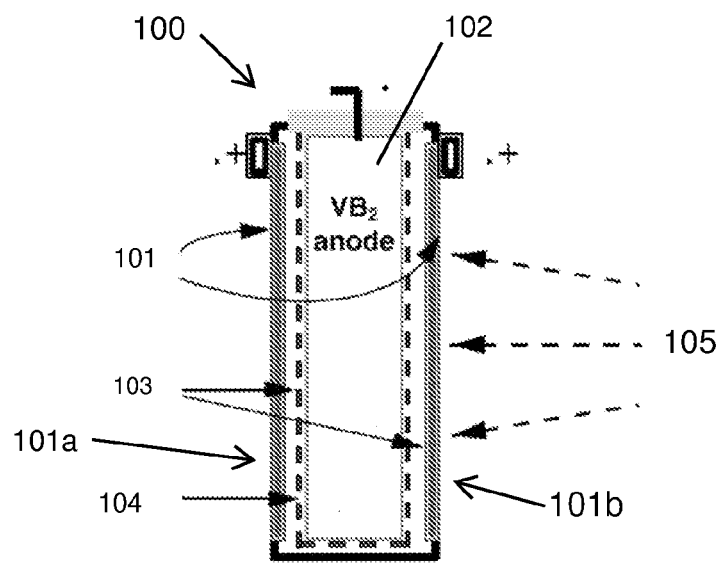
FIG. 2 is a schematic illustrating a cell configuration for a vanadium boride air battery.

FIG. 2 is a schematic illustrating a cell configuration for a vanadium boride air battery. The cell configuration shown in FIG. 2 is based on an electric vehicle cell configuration and is for the purposes of illustration only. As shown in FIG. 2, an air battery 100 includes an air cathode 101 to reduce oxygen molecules and an anode 102 formed of vanadium boride nanoparticles. The air cathode 101 and the anode 102 are in electrochemical contact with each other through an electrically neutral ionic conductor (electrolyte) 103. Oxygen from air 105 to be reduced at the air cathode, enters the battery 100 at both faces 101a and 101b and is dissolved in the electrically neutral ionic conductor 103. The conductor 103 may be of an aqueous solution including a high concentration of hydroxide such as KOH or any other suitable ionic conductor material. A membrane 104 acting as a separator is also provided for minimizing the non-electrochemical interaction between the anode 102 and the air cathode 101.

The air cathode 101 may be formed of any of the following materials, which act as a catalyst effective for the reduction of dissolved oxygen, such as activated carbon, carbon black, graphite or a high surface area carbon, dispersed on a metal grid.

Figure 3:
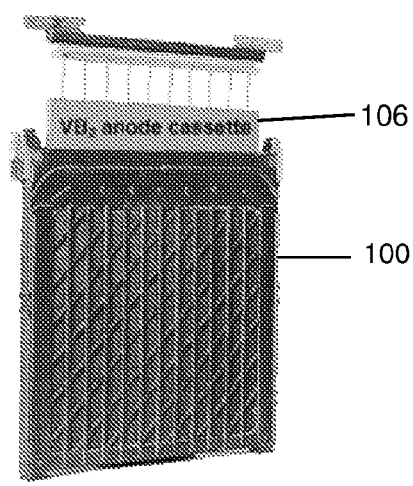
FIG. 3 is a diagram illustrating a side view of an anode cassette of the cell shown in FIG. 1.
Figure 4:
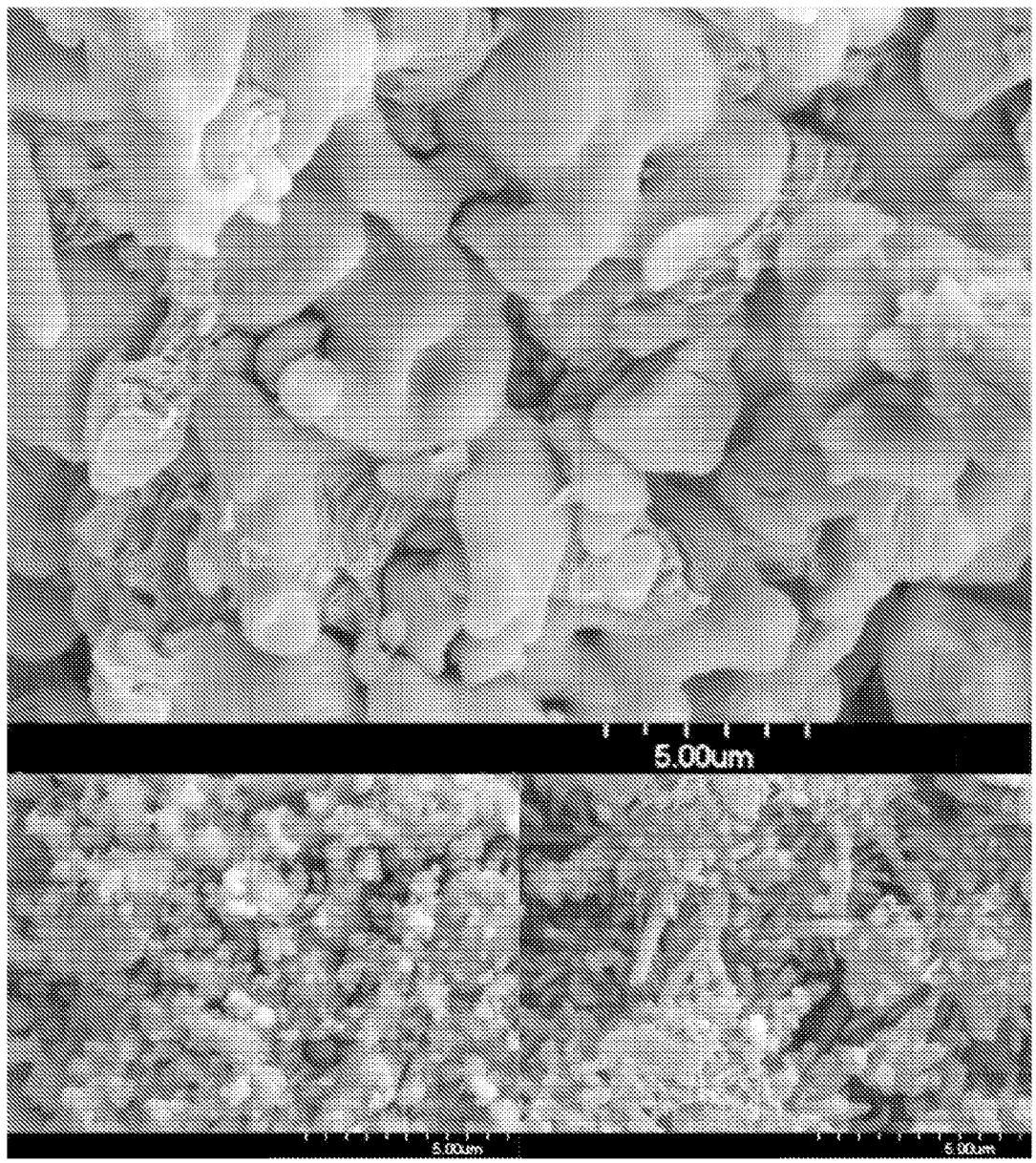
FIG. 4 is a scanning electron microscope (SEM) image of micrometer-sized $VB_2$ particles compared to nanometer-sized super-iron particles.

The anode 102 can be disposed in an extractable anode cassette 106 as shown in FIG. 3, for example. The cassette 106 has a large surface area of 50 square centimeters ($cm^2$), and is scaleable to smaller or larger areas. For example, the predetermined surface area of the extractable anode cassette 106 may be 1 $cm^2$ to 10,000 $cm^2$. Within this range the predetermined surface area may be of 1 $cm^2$ to 100 $cm^2$, or 100 $cm^2$ to 10,000 $cm^2$. The cassette 106 increases the speed of refueling and refreshing the vanadium boride battery 106. Alternatively, a flat cell configuration may be implemented using an extractable cassette with exchangeable refreshed cassettes for rapid exchange to recharge the battery 100.

Figure 5:
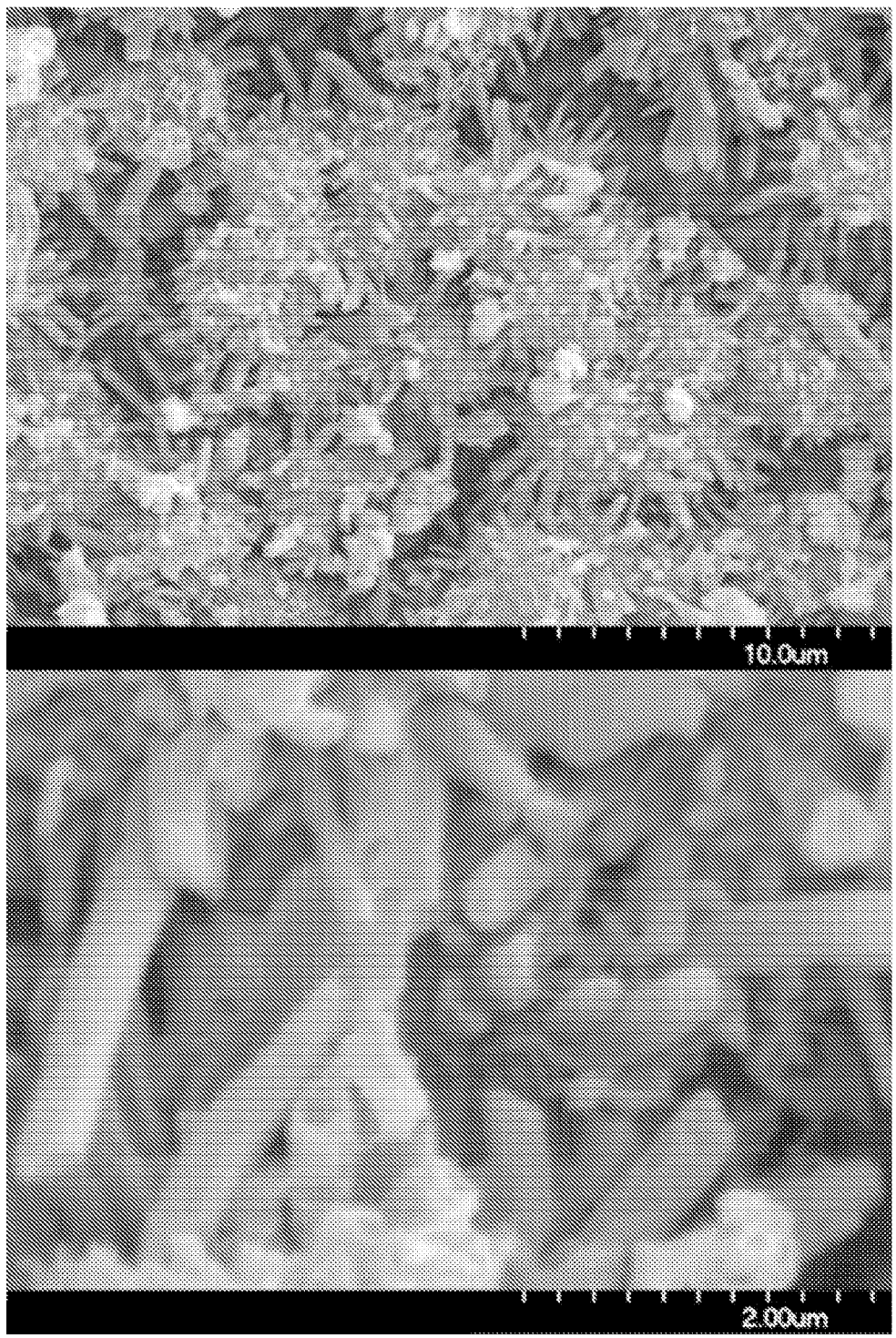
FIG. 5 is a scanning electron microscope (SEM) image of nanorod $VB_2$.
Figure 6:
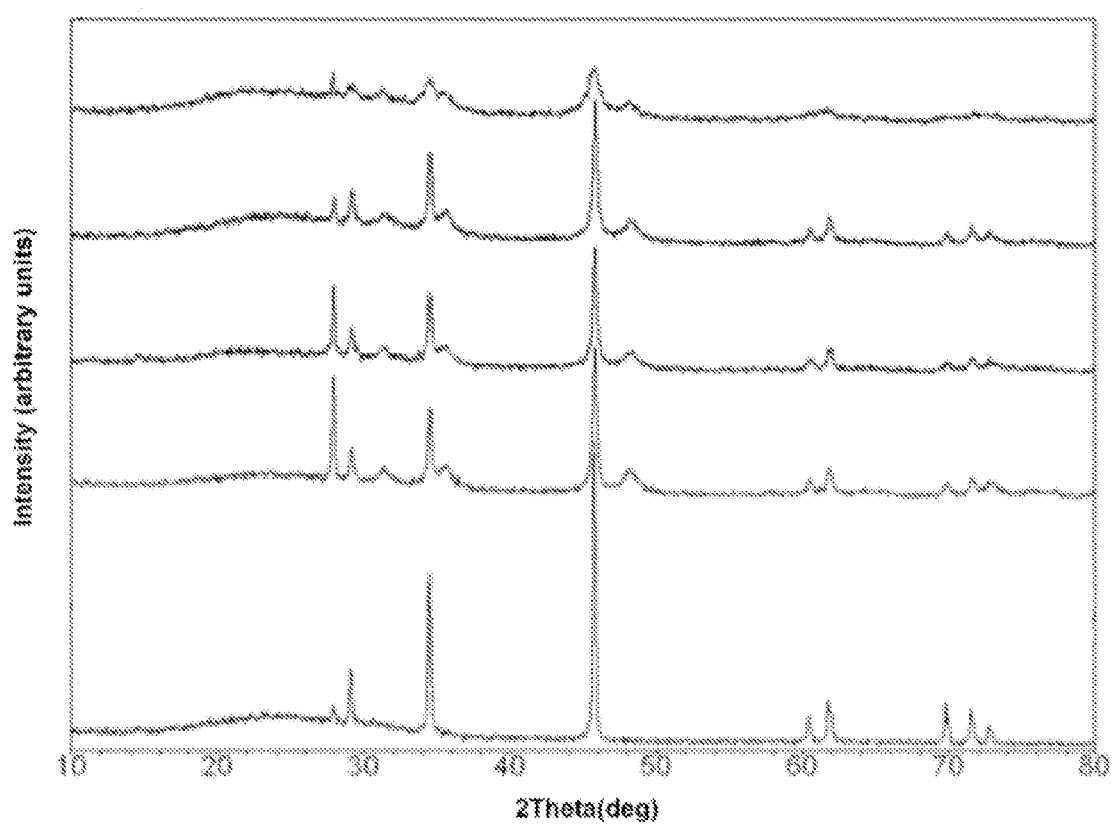
FIG. 6 is a powder x-ray diffraction spectra of micrometer-sized $VB_2$ particles compared to nanometer-sized super-iron particles.
Figure 7:
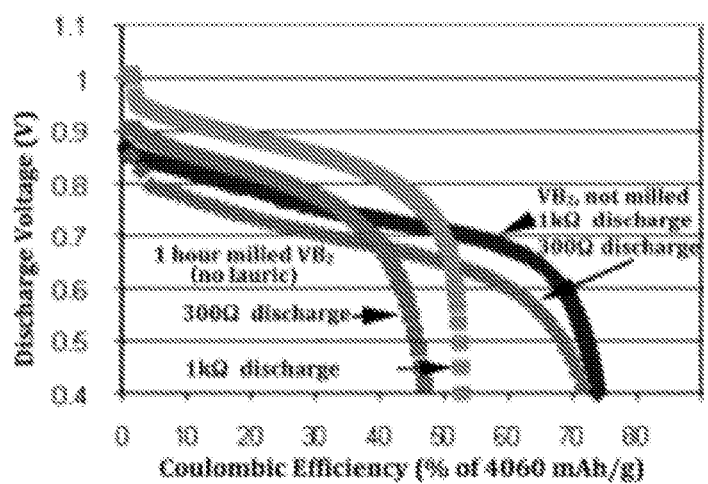
FIG. 7 is a chart illustrating an example of a discharge of vanadium boride air batteries that exhibits higher voltage, but efficiency loss, when ground vanadium boride is employed.

FIG. 5 compares scanning electron microscope (SEM) images of conventional and nano sized $VB_2$. As seen in the top SEM in the figure conventional vanadium boride consists of a range of primarily 1 to 5 micron particles. As seen in the bottom left SEM in the figure, nanoparticles may be formed when the conventional material is ground in a tungsten carbide vessel, and consists of 100 to 500 nanometer particles formed following 1 hour of planetary ball milling of conventional vanadium boride without additives. As seen in the bottom right SEM 100 to 500 nanometer wide nanorods are formed following 2 hour of planetary ball milling of conventional vanadium boride, mixed with fatty acid (10% lauric "dodecanoic" acid), in a tungsten carbide vessel. FIG. 6 presents SEM, with higher and lower magnification, of the 100 to 500 nanometer wide nanorods formed following 2 hours of planetary ball milling of conventional vanadium boride, mixed with fatty acid (10% lauric "dodecanoic" acid), in a tungsten carbide vessel. FIG. 7 compares x-ray powder diffraction spectra of conventional (bottom diffraction pattern) and nano sized vanadium boride. As seen in the figure, following 1 hour of grinding without additives (top), a broadening of the peaks is evident, consistent with an increased amorphous character of the powder. The peaks are narrow indicative of the crystalline character of the powder, following either 1 hour (second from bottom) or 2 hour (third from bottom) grinding with 10% lauric (dodecanoic) acid, or 2 hour grinding with 10% palmitic (heaxadecanoic) acid (second from top).

During experimentations, it was determined that electron discharge of alkaline vanadium boride is electrochemically irreversible, magnesium (Mg) provides a ready, energetic pathway to regenerate vanadium boride from the fuel cell discharge products, providing a viable route to cell recharge. Specifically, dried vanadate and borate products were added to Mg and ball milled for approximately 24 hour in an argon atmosphere at room temperature and impurities including (e.g., MgO and residual reactants) were removed by leaching the as-milled powder with a 10% HCl solution for approximately 1 hour. The solution was decanted after leaching, the solid product was washed with deionized water and vacuum dried.

The anode can also be recharged using hydrogen gas. The vanadium boride cell can employ an extractable anode cassette (as depicted in FIG. 3). The discharged cassettes are recharged in a scalable process. Prior to extraction of the used anode cassette, the electrolyte can be removed by automated process (e.g., a masterflex pump). The anode cassette may be extracted and conveyed to a tube or other closed container. Heated hydrogen gas is then cycled into the tube to pass over the cassette bed of vanadate/borate of the dried discharge products and refreshes the cassette and reduces the vandate and borate back to a starting material for reinsertion into the refueled battery. The recharge is kept to over 100° C. to eliminate water, formed from the hydrogen as steam.

This high temperature recharge, which is chemical (hydrogen reduction reaction) in nature, is also effective as an electrochemical recharge, in which rather than hydrogen, electrons are used to restore the vanadium boride from a melt of the discharge products. One of the discharge products, $B_2O_3$, which melts at approximately 500° C. and forms a clear liquid, dissolves a simultaneous discharge product, $V_2O_5$, which is yellow-orange (melting point 690° C.) and dissolves in molten $B_2O_3$. Inserting anode and cathode electrodes into the melt, for example at 750° C., and applying an electrical potential reforms vanadium boride, observed as a black product at the cathode and releases oxygen at the anode. This recharge method can be used to either recharge the room temperature alkaline vanadium boride air battery discharge product, or as a charge cycle of a stand alone molten vanadium boride air rechargeable battery.

The methods and batteries are further illustrated by the following non-limiting examples.

EXAMPLE 1

Higher Theoretical $VB_2$/Air Battery Discharge Voltage

The vanadium boride air battery has an unusual high capacity due to its 11 electron per molecule discharge capacity. Based on experimental discharge, the discharge potential of the high capacity battery was approximately 1.3 volts (V). The fundamental thermo-chemical enthalpy and entropy of the reaction components however, enable the calculation of a theoretical discharge potential of approximately 1.55 volts (V).

Cell: $VB_2 + 11/4 O_2 \rightarrow B_2O_3 + \frac{1}{2} V_2O_5$   $E_{cell}$=1.55 volts (V)

The intrinsic storage capacity of the battery is 1.55 volts (V)×20,700 Ah/L=32,000 Watt hours/liter (Wh/L).

EXAMPLE 2

High Vanadium Boride Battery Voltage

The $VB_2$ air battery open circuit potential is higher and a portion of the higher voltage is accessible through nano-synthetic techniques and inclusion and discharge of the nanomaterials. There is an increased experimental discharge battery voltage when nano-chemical synthesized $VB_2$. is used in lieu of conventional (micron dimension) vanadium boride. A method synthesizing small (e.g., 10 nanometers (nm)) $VB_2$ particles was previously reported, although the $VB_2$ was not electrochemically characterized in that example. The prior art synthesis was repeated, and the properties of the material in a vanadium boride air battery was electrochemically characterized. It was observed that the nanoparticle anode in this experimentation had an open circuit potential of approximately 1.2 volts (V) and exhibits a discharge potential of 1.15 V, approximately 0.2 volts (V) greater observed than in micron-dimensioned $VB_2$ particle air batteries. Specifically, a mechano-chemical synthesis of $VB_2$ was accomplished with through the high energy ball mill assisted chemical reaction of:

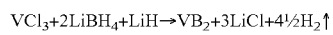
$VCl_3 + 2LiBH_4 + LiH \rightarrow VB_2 + 3LiCl + 4\frac{1}{2}H_2 \uparrow$ The washed product, nanocrystalline $VB_2$, was mixed with graphite, and was used to replace the zinc anode in a conventional 1 cm diameter zinc-air coin cell, and discharged with a constant resistive load. The battery with the nano-particle vanadium boride cathode exhibited the higher potential. However the material was not stable. It exhibited a low (coulombic) efficiency, that is it discharged to less than half of the 11 electron capacity of 4060 mAh/g.

EXAMPLE 3

High Efficiency and High Voltage Vanadium Boride Battery

Figure 8:
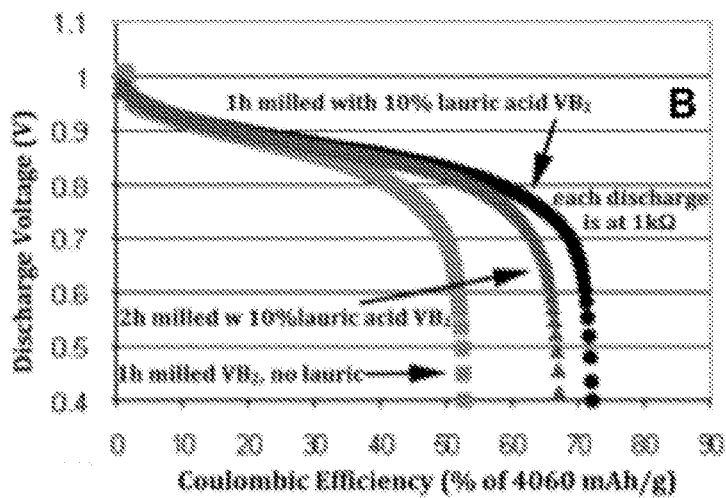
FIG. 8 is a chart illustrating an example of a discharge of vanadium boride air batteries that is improved within embodiments of the present invention.
Figure 9:
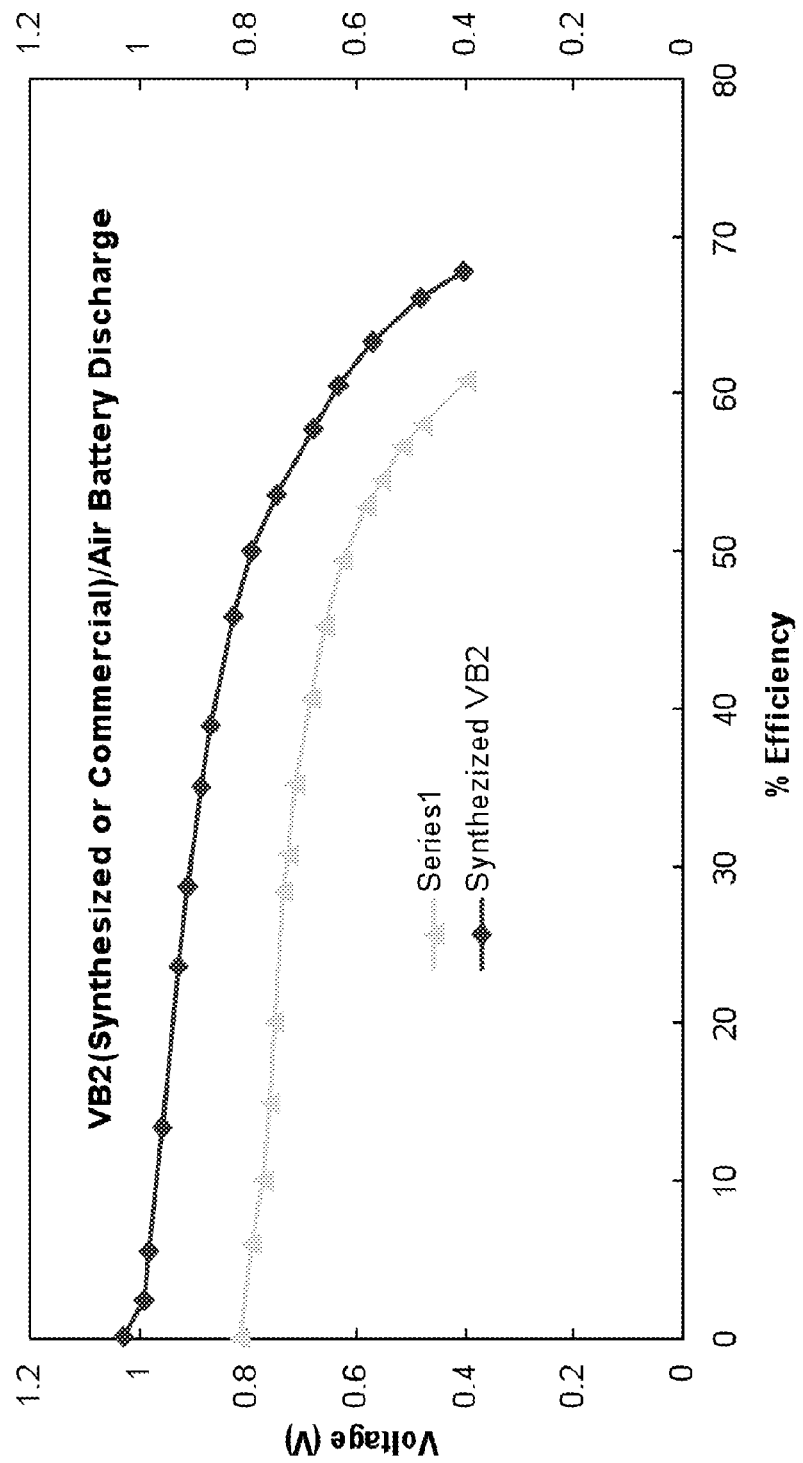
FIG. 9 is a chart illustrating discharge curves from $VB_2$-air cells. 10 mAh cells were discharged over 3000Ω loads. Synthesized material was prepared by ball milling a mixture of V:B=1:2 ratio in a Retsch PM 100 ball mill for 4 hours at 600 RPM.
Figure 10:
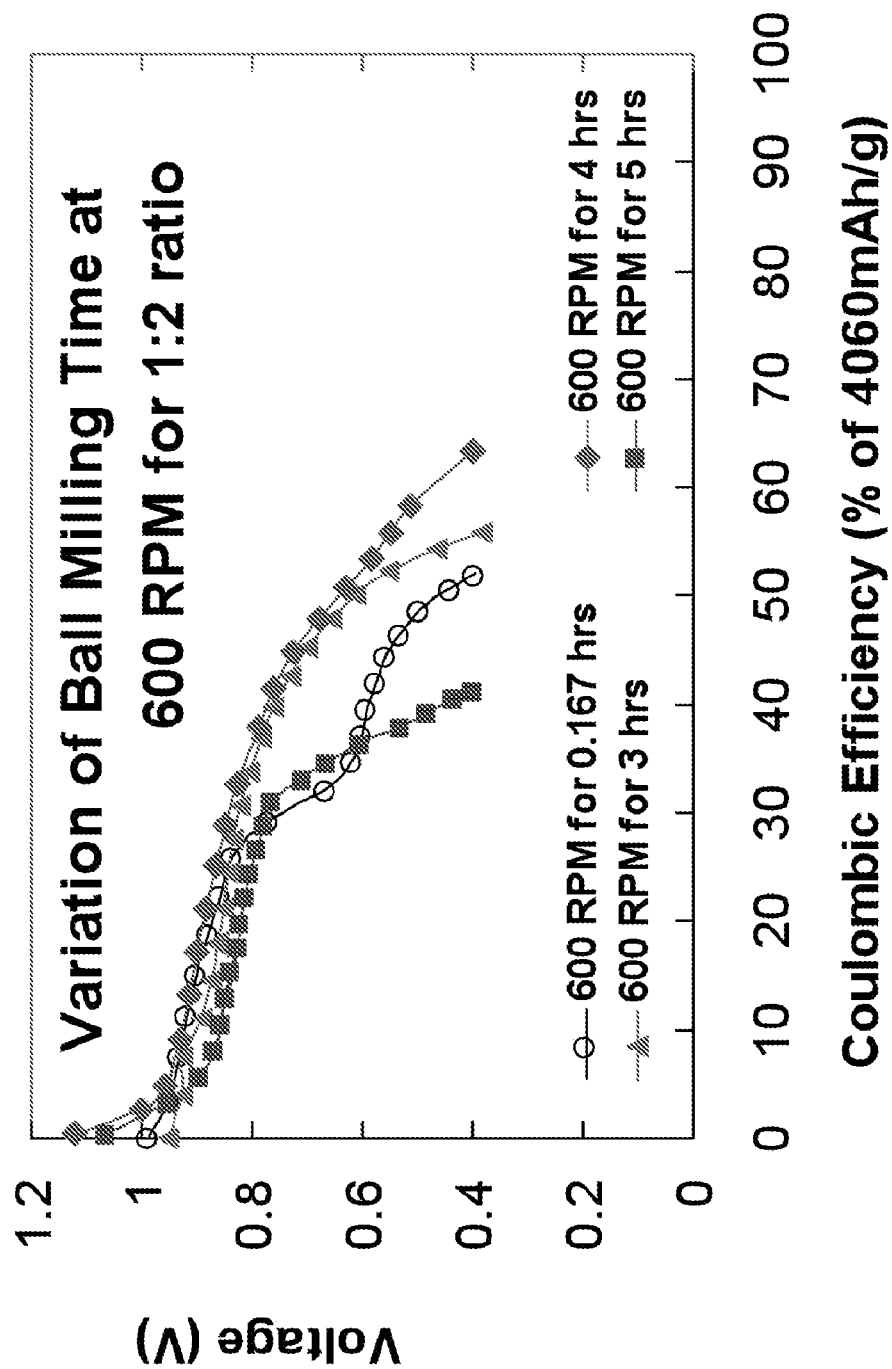
FIG. 10 is a chart illustrating discharge curves of cells with ball milled mixtures of V:B=1:2 for varied ball milling times between 10 minutes and 5 hours at fixed 600 RPM. 10 mAh cells were discharged over 3000Ω loads.
Figure 11:
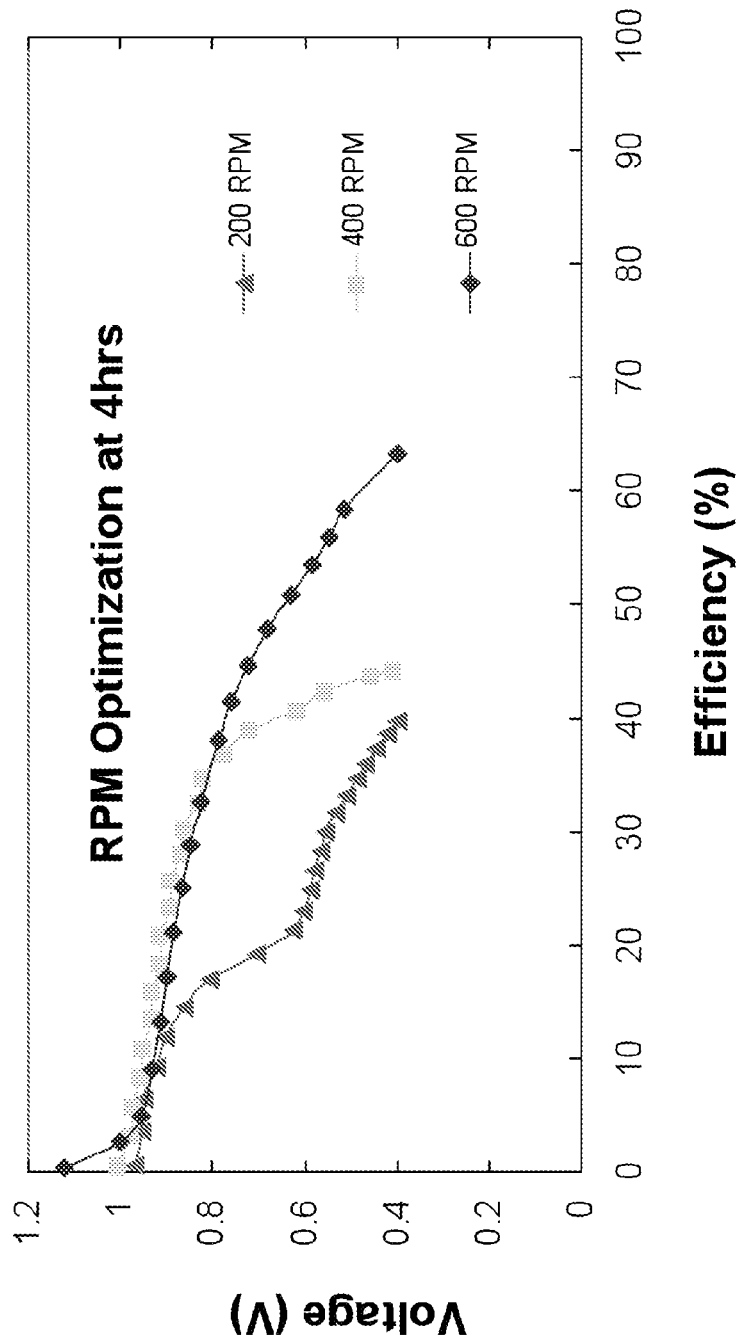
FIG. 11 is a chart illustrating discharge curves for vanadium diboride synthesis at varying RPM at fixed 4 hours milling time and a fixed ratio of 1:2 of elemental vanadium and boron.

A further example of an increase of the battery voltage when nano-particle $VB_2$ replaces micron-particle is shown in FIG. 8. A means to retain a high discharge efficiency with the improved voltage is shown in FIG. 9. Specifically, commercial micron-particle $VB_2$ from (American Elements) was ground, during one hour, to nano-sized with a planetary ball mill in a tungsten carbide vessel with tungsten carbide bearings at 500 revolutions per minute (RPM) under an inert atmosphere, mixed with graphite and used as an anode to replace the zinc anode in a commercial 1 cm zinc-air (Panasonic ZA675 (PR675H)) battery. As shown in FIG. 8, the discharge voltage of the ground VB) anode is 0.1 V to 0.2 V higher than with the micron-sized $VB_2$ anode, either with a 300 or a 1000 ohm battery discharge load. This discharge voltage using nano-particles formed by mechanical synthesis is less than that of the discharge voltage observed in Example 2 for nano-particles formed by mechano-chemical synthesis, but both are larger than observed for micron-particle anode battery discharge. Although the ground material exhibits a higher voltage, it is less stable and exhibits a lower efficiency than the unground material. However, when a fatty acid, such as lauric acid, is added to the commercial $VB_2$, and ground in the same manner, this stabilizes the particles. When this ground with fatty acid vanadium boride is used to form the anode, then, as shown in FIG. 9, the vanadium boride battery exhibits both improved voltage, while retaining a high efficiency during discharge. As seen in the figure, a large portion of the discharge efficiency is retained even when the material is formed with 2 hour, instead of 1 hour, of ball mill grinding with the fatty acid. The cells discharged in FIGS. 8 and 9 were prepared by hand mix of the $VB_2$ with 50%, by weight, of graphite. The graphite improves the conductivity and discharge of the anode, but decreases the quantity of active battery material. When this mixture is decreased to 20% by weight of graphite, the discharge capacity of the commercial $VB_2$ decreases, and the advantage of the nanoparticulate $VB_2$ is evident. Specifically, as seen in Table 1, the anode with $VB_2$ formed by 1 hour of planetary ball grinding, with 10% lauric (dodecanoic) acid, largely retains its discharge efficiency when formed by hand mix with 20% rather than 50% graphite, while the commercial $VB_2$, or $VB_2$ formed without the fatty acid, lose a substantial quantity of their discharge capacity when prepared with 20% graphite. For the 20% graphite admix anode, when the $VB_2$ formed with 10% lauric acid is discharged at even higher rate (with a 300 ohm, rather than 1000 ohm, discharge load), the discharge efficiency to a 0.4 volt cutoff remains high at 52% of the theoretical 11 electron capacity, while the discharge efficiency of the not ground, commercial $VB_2$ falls to 33%.

TABLE 1

The discharge efficiency, as measured by the discharge capacity to a 0.4 V cutoff voltage, of the vanadium boride air batteries discharged with a 1000 ohm load. Ground refers to 1 hour of planetary ball grinding without additives. Ground with fatty acid refers to 1 hour of planetary ball grinding with 10%, by weight, lauric acid.

| Anode Conditions | Efficiency with 50% graphite | Efficiency with 20% graphite |
|---|---|---|
| commercial $VB_2$ | 75% | 33% |
| ground $VB_2$ | 52% | 32% |
| ground $VB_2$ with fatty acid | 72% | 70% |

EXAMPLE 4

Synthesis and Discharge of Vanadium Boride Nanoparticles from Elemental Vanadium and Boron Elemental vanadium (99.5%, −325 Mesh, Alfa Aesar) and boron (98%, −325 Mesh, Alfa Aesar) in a 1:2 mole ratio were used to prepare vanadium boride. 0.50 g of vanadium and 0.21 g boron was used for all synthesis. The entire preparation process was performed in an argon atmosphere, and the mixture was placed into a 50 milliliter (mL) tungsten carbide ball milling jar (Retsch part number 01.462.0156) along with ten tungsten carbide bearings that had a diameter of 10 millimeters (mm). The jar containing the bearings and vanadium and boron mixture was sealed in an argon atmosphere and transferred to a Retsch PM 100 ball milling machine. Initial results were obtained by milling the material at 600 RPM for 4 hours continuously. One set of experiments focused on varying the milling time at a fixed rotation speed (600 RPM) and another focused on varying rotation speed at a fixed milling time (4 hours). Upon completion of the ball milling program, the temperature of the jar was allowed to return to room temperature and the powdered material was collected in an argon atmosphere. The vanadium boride nanoparticles formed in ball milling were evaluated as an anode material in vanadium boride air batteries as well as with x-ray powder diffraction analysis (XRD) and scanning electron microscopy (SEM).

Panasonic 675 Zinc Air batteries (Panasonic Corporation, Japan) with 1 $cm^2$ anode surface area were used to fabricate the cells. The anode from the Panasonic battery was replaced with a mixture of the synthesized $VB_2$ and 2 micron graphite powder in a ratio such that 20% of the total weight of the mixture was graphite. A solution mixture of 5M each KOH and NaOH was used as the electrolyte and the loading of the anode material for each cell was 10 mAh. $VB_2$ cells were discharged across a resistor loading of 3000 ohms ($\Omega$) and the battery discharge data was recorded using a DAQ module (National Instruments NI-USB-6211) and LabVIEW software. For the purpose of comparison of results, cells were fabricated using $VB_2$ purchased from American Elements, U.S.A with a purity of 99.999%. The cell preparation and testing was done following the same procedures described above.

Nearly 70% of the theoretical initial capacity was discharged by $VB_2$ synthesized by our procedure, which was a superior discharge capacity than that of the commercially available vanadium diboride as shown in FIG. 1. The discharges of the synthesized material also exhibited a higher voltage discharge that is characteristic of vanadium boride nanoparticles, and SEM images confirmed the sub micron domain of the synthesized material particle.

In order to optimize the synthesis process by adjusting the ball milling time of the synthesis of $VB_2$, cell discharge curves corresponding to ball milling times between 10 minutes and 5 hours are shown in FIG. 2. The ball milling process can cause adequate thermal energy and impact conditions to impart the energy to $VB_2$ from the elemental metals. This idea is supported by the fact that under low energetic conditions such as low RPM, formation of $VB_2$ may not be optimum, leading to lower columbic efficiencies in the cells. The cell discharge efficiency of the mixture improved for times longer than 20 minutes and highest efficiency was observed at approximately 4 hours, though there seems to be neither an improvement nor a decrease in longer milling times. Studies of ball milling speed showed that better coulombic efficiencies were linked to higher RPM values. As shown in FIG. 3, discharge efficiencies continually increased with increasing RPM. At 200 RPM the discharge efficiencies observed were lower than 40% and the highest efficiencies were noticed for 600 RPM.

Described herein is an improved vanadium boride-air multiple electron high capacity battery which includes the use of nano-particulate vanadium borides as the anode material. As mentioned, the nano-particulate vanadium boride is prepared by use of a hardness milling technique to improve discharge qualities of the anode. The nano-particulate vanadium borides further exhibits a discharge potential in excess of 1 volt, and sustains higher power capabilities than the previous micron dimensioned vanadium borides. The high volumetric energy density compared to the zinc-air permits thinner anode cassettes, which results in higher relative surface areas of air cathode and sustains higher rate capabilities. The vanadium boride air cell is considerably thinner than the zinc-air cells. The extractable anode cassettes and hydrogen recharge process permits rapid refueling and reuse of the battery.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one ore more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A battery comprising an anode and a cathode in electrochemical contact with each other through an electrically neutral ionic conductor wherein the anode comprises greater than or equal to 1% in weight of vanadium boride nanoparticles having a particle size greater than 100 nm.

2. The battery of claim 1, wherein the cathode is an air cathode, wherein an electrical discharge of the cathode is performed via a reduction of oxygen.

3. The battery of claim 1, wherein the vanadium boride nanoparticles are formed by using a mechanical synthesis process with grinding.

4. The battery of claim 3, wherein the grinding is performed with a grinding medium media comprised of tungsten carbide or other material having a hardness comparable to that of the vanadium boride.

5. The battery of claim 1, further comprising an extractable anode cassette, wherein the anode is disposed in the extractable anode cassette.

6. The battery of claim 5, wherein the extractable anode cassette is formed of a predetermined surface area of approximately 1 $cm^2$ to 100 $cm^2$.

7. The battery of claim 5, wherein the extractable anode cassette is formed of a predetermined surface area of approximately 100 $cm^2$ to 10,000 $cm^2$.

8. The battery of claim 1, wherein vanadium boride salts of approximately 8 to 9 Mohs are used for forming the vanadium boride nanoparticles of the anode.

9. The battery of claim 1, wherein the vanadium boride nanoparticles are formed from a 1:2 mole ratio of elemental vanadium and boron.

10. The battery of claim 1, where the vanadium boride nanoparticles have a particle size greater than 100 nm and up to 1 micron.

11. The battery of claim 1, where the vanadium boride nanoparticles have a particle size greater than 100 nm and up to about 500 nm.

12. The battery of claim 1, wherein the vanadium boride nanoparticles further comprise an aliphatic carboxylic acid, a salt thereof, or any combination thereof.

13. The battery of claim 10, wherein the vanadium boride nanoparticles further comprise an aliphatic carboxylic acid selected from the group consisting of propanoic acid, butyric acid, valeric acid, caproic acid, enanthic acid, caprylic acid, pelargonic carpric undecylic acid, lauric acid, tridecylic acid, myrstic acid, pentadecylic acid, palmitic acid, margaric acid, stearic acid, nonadecylic acid, arachidic acid, heneicosylic acid, behenic acid, tricosylic acid, lignoceric acid, pentacosylic acid, cerotic acid, heptacosylic acid, montanic acid, nonacosylic acid, merlissic acid, henatriacontylic acid, lacceroic acid, psyllic acid, geddic acid, cerosplastic acid, hexatriacontylic acid, a salt thereof, and any combination thereof.

* * * * *